United States Patent
Kweon

Patent Number: 6,055,284
Date of Patent: Apr. 25, 2000

[54] SYMBOL TIMING RECOVERY CIRCUIT IN DIGITAL DEMODULATOR

[75] Inventor: Oh Sang Kweon, Seoul, Rep. of Korea

[73] Assignee: Daewoo Electronics Co., Ltd., Seoul, Rep. of Korea

[21] Appl. No.: 08/941,654

[22] Filed: Sep. 30, 1997

[30] Foreign Application Priority Data

Sep. 30, 1996 [KR] Rep. of Korea ...................... 96-43230

[51] Int. Cl.$^7$ ...................................................... H04L 7/00
[52] U.S. Cl. ........................ 375/355; 375/222; 375/350; 341/61; 327/141
[58] Field of Search ................................... 375/222, 230, 375/235, 327, 346, 349, 350, 354, 355, 371, 373, 375, 376; 327/41, 141; 341/61, 110; 455/307, 337; 360/51

[56] References Cited

U.S. PATENT DOCUMENTS

| | | | |
|---|---|---|---|
| 4,692,931 | 9/1987 | Ohsawa | 375/355 |
| 4,707,841 | 11/1987 | Yen et al. | 375/230 |
| 5,612,975 | 3/1997 | Becker et al. | 375/319 |
| 5,724,396 | 3/1998 | Claydon et al. | 375/355 |

*Primary Examiner*—Stephen Chin
*Assistant Examiner*—Chieh M. Fan
*Attorney, Agent, or Firm*—Pillsbury Madison & Sutro LLP

[57] ABSTRACT

A symbol timing recovery circuit in a digital demodulator is disclosed. The symbol timing recovery circuit comprises means for generating a clock signal in a predetermined period, means for sampling a received signal according to the clock signal, an interpolator for interpolating the output signal from the sampling means according to a filter tap coefficients calculated by a fractional interval at each sampling period to obtain an interpolant, a data filter for filtering the interpolant and providing the filtered interpolants as a strobe data, a timing error detector for detecting a timing error from the strobe data to generate a timing error signal, a loop filter for filtering the timing error signal to obtain and provide a mean timing error signal; and a controller for providing the fractional interval and controlling the signal processing operation of the data filter, timing error detector, and loop filter according to the mean timing error signal. By having this structure, the data filter, timing error detector and loop filter perform a signal processing according to the valid interpolant of the interpolant outputs from the interpolator, hence the symbol timing recovery circuit in the digital modulator can be simplified.

4 Claims, 5 Drawing Sheets

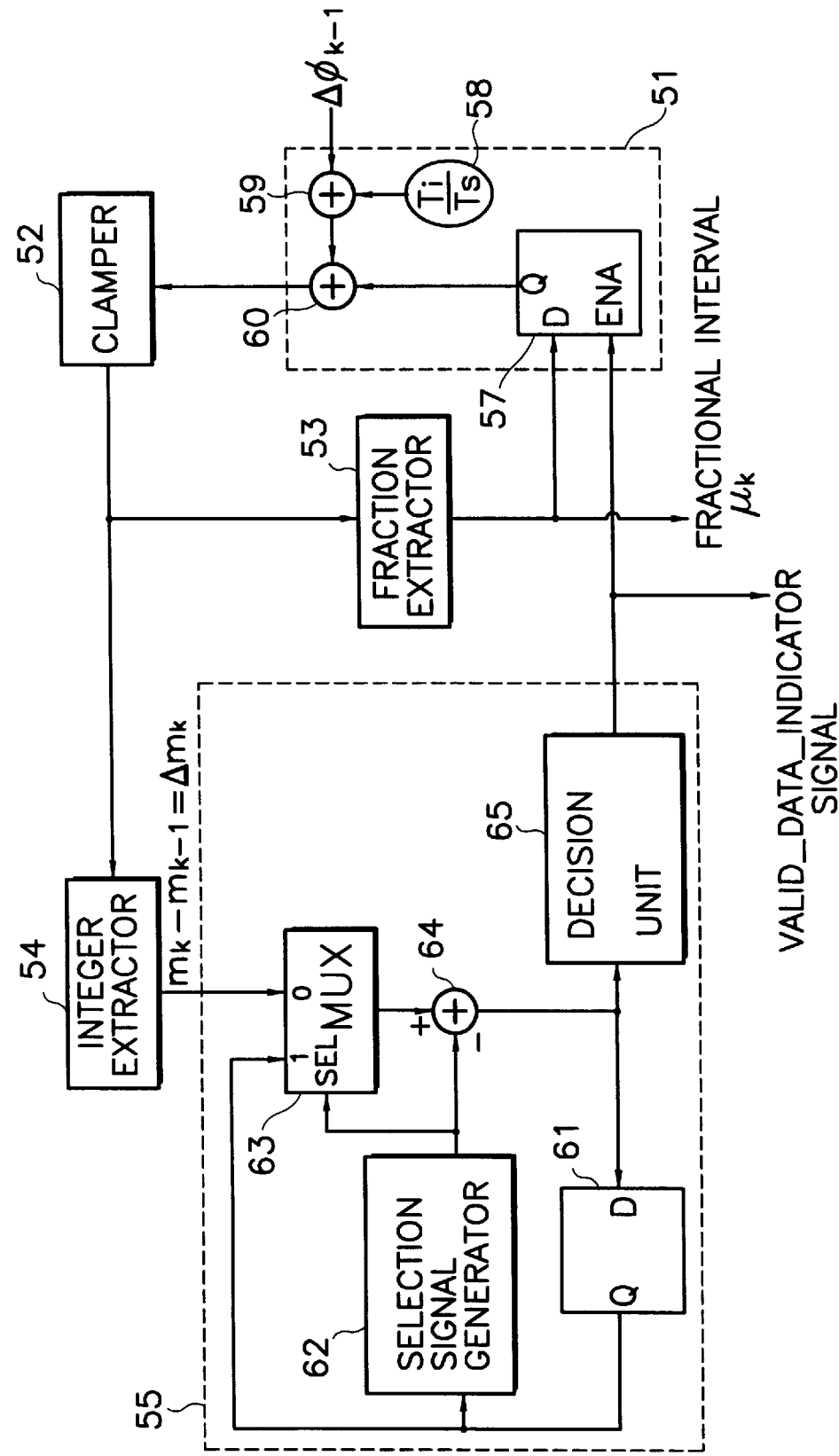

SYMBOL TIMING RECOVERY CIRCUIT IN DIGITAL DEMODULATOR

BACKGROUND OF THE INVENTION

1. Field of the Invention

The present invention relates to a symbol timing recovery circuit in a digital demodulator for demodulating received modulated signal by a digital method, and more particularly, to a symbol timing recovery circuit for calculating an accurate symbol rate from a received signal in a variable rate digital demodulator.

2. Description of the Prior Art

In digital communication system, a receiver samples transmitted analog signal in a predetermined sampling clock converting it into a digital signal. A carrier signal having frequency and phase corresponding to modulators used in a transmitter is recovered from the digital signal, and a demodulation is performed by using the recovered carrier signal to recover an original information signal. In a timing recovery circuit, an exact sampling clock, which affects the efficiency of the receiver, is determined.

In digital modems, when sampling is synchronized with data symbol, a feedback loop for controlling the sampling clock by adjusting the phase of local clock or a feedforward loop utilizing regenerated timing wave from the received modulation signal is used, as in an analog modem. When the sampling is not synchronized with the data symbol, namely if the sampling clock is not related to the symbol timing, the timing is controlled by an interpolation. By interpolating between unsynchronized samples, exact strobe values in the modem are generated, similar to the strobe values generated when the sampling is synchronized with the symbol.

FIG. 1 shows a block diagram of a conventional digital timing recovery circuit, that performs the timing recovery using a feedback loop. The digital timing recovery circuit comprises a sampling clock generator 11, a first sampler 12, an interpolator 13, a data filter 14, a timing error detector 15, a loop filter 16, and a controller 17.

In FIG. 1, the sampling clock generator 11 generates a sampling clock in period Ts, in which aliasing does not occur. The first sampler 12 generates a signal X(mTs), which samples a band limited input signal X(t) according to the sampling clock, and outputs it. The interpolator 13 generates and outputs an interpolant y(kTi) for interpolating the signal X(mTs) in interpolation interval Ti. The data filter 14 filters the interpolant y(kTi) to output the final strobe data. The timing error detector 15 detects a timing error from the strobe data. The loop filter 16 removes a noise component of the detected timing error. The controller 17 controls an operation of the interpolator 13 by using the filtered timing error to perform the exact timing recovery.

Referring to FIG. 2, a digitization of the interpolator 13 will be described in detail. FIG. 2 shows a block diagram for explaining an operation of the interpolator 13 in FIG. 1. The interpolator 13 comprises a digital/analog (D/A) converter 21, an interpolating filter 22, and a second sampler 23. In FIG. 2, a sampled signal X(mTs) from a first sampler 12 shown in FIG. 1 is converted into an analog signal x(t) by the D/A converter 21. The analog signal x(t) is filtered by the interpolating filter 22 to generate an interpolated signal y(t). The interpolated signal y(t) is resampled by the second sampler 23 to be outputted as an interpolant y(kTi). Here, the sampling interval of the second sampler 23, namely the interval between the interpolants Ti is provided from the controller 17 in FIG. 1.

An output y(t) from the interpolating filter 22 is expressed by the following expression 1, when an impulse response of the interpolating filter 22 is $h_I(t)$.

$$y(t) = \sum_m x(mTs)h_I(t - mTs) \quad \text{Expression 1}$$

Here, the original signal x(t) does not coincide with the filtered signal y(t). A new sample is obtained by resampling the output y(t) at t=kTi in the second sampler 23, namely interpolant y(kTi), which is expressed by the following expression 2.

$$y(kTi) = \sum_m x(mTs)h_I(kTi - mTs) \quad \text{Expression 2}$$

In the above expression 2, if the input signal x(m), the impulse response $h_I(t)$ of the interpolating filter 22, the sampling interval mTs of the first sampler 12, and the sampling interval kTi of the second sampler 23 are known, the interpolant can be calculated digitally from the above expression 2.

To define the variables used in the expression 2, when m is a signal index, a filter index i, basepoint index $m_k$, fractional interval $\mu_k$ can be calculated by the following expression 3.

$$\text{signal index: } m \quad \text{Expression 3}$$
$$\text{filter index: } i = int\left[\frac{kTi}{Ts}\right] - m$$
$$\text{basepoint index: } m_k = int\left[\frac{kTi}{Ts}\right]$$
$$\text{fractional interval: } \mu_k = \frac{kTi}{Ts} - m_k$$

In the above expression 3, int[z] refers to the largest integer not exceeding z, where $0 \leq \mu_k < 1$. Here, the fractional interval $\mu_k$ is very important for adjusting the resampling interval of the interpolator 13, and it is calculated in the controller 17 to be provided to the second sampler 23.

Meanwhile, the variations in the fractional interval $\mu_k$ in respect to the relationship between the intervals Ts and Ti of the first sampler 12 and second sampler 23, respectively, are examined. First, when Ti cannot fractionally reduce with Ts, the fractional interval $\mu_k$ will be irrational and will change for each interpolant. Second, if Ti is assumed very nearly equal to Ts, as if the sampling is nearly synchronized, then the fractional interval $\mu_k$ changes very slowly; if it is quantized, it remains constant over many interpolants. Third, if Ts fractionally reduces with Ti, but not equal Ti, then the fractional interval $\mu_k$ repeats periodically. The expression 2 can be alternatively expressed into the following expression 4 through the substitution by the variables from the expression 3.

$$y(kTi) = y[(m_k + \mu_k)Ts] = \sum_{i=I1}^{I2} x[(m_k - i)Ts]h_I[(i + \mu_k)Ts] \quad \text{Expression 4}$$

A digital interpolation in a modem can be achieved by the above expression 4. The impulse response value $h_I[(i+\mu_k)Ts]$ of the interpolating filter 22 is a filter tap-coefficient.

The time intervals kTi and (k+1)Ti of the consecutive interpolants is expressed by the following expression 5.

$$kTi = (m_k + \mu_k)Ts \quad \text{Expression 5}$$

$$(k+1)Ti = (m_{k+1} + \mu_{k+1})Ts$$

By the difference of the above equations, the next basepoint index $m_{k+1}$ can be expressed by the following expression 6.

$$m_{k+1} = m_k + \frac{Ti}{Ts} + \mu_k - \mu_{k+1} \quad \text{Expression 6}$$

Here, according to the variables in the expression 3, the basepoint indices $m_k$ and $m_{k+1}$ are an integer, and the fractional interval is $0 \leq \mu_k, \mu_{k+1} < 1$. Accordingly, the basepoint index increment $\Delta m_k$ is expressed the following expression 7.

$$\Delta m_k = m_{k+1} - m_k = int\left[\frac{Ti}{Ts} + \mu_k - \mu_{k+1}\right] \quad \text{Expression 7}$$

And, according to the expression 6, the fractional part fp[ ] of the increment is calculated to be zero, hence the next fractional interval $\mu_{k+1}$ can be expressed the following expression 8.

$$fp[m_{k+1} - m_k] = fp\left[\frac{Ti}{Ts} + \mu_k - \mu_{k+1}\right] = 0 \quad \text{Expression 8}$$

$$\therefore \mu_{k+1} = \left[\mu_k + \frac{Ti}{Ts}\right] \mod - 1$$

Accordingly, the controller 17 has the structural embodiments for calculating the fraction interval $\mu_k$ and basepoint index increment $\Delta m_k$ according to the expressions 7 and 8. Accordingly, the interpolator 13 has the structural embodiments for calculating the interpolants by the expression 4 according to the values provided from the controller 17. By having the structural embodiments of the above controller 17 and interpolator 13, an accurate symbol timing recovery circuit in digital demodulator is provided.

SUMMARY OF THE INVENTION

In view of the foregoing, it is an object of the present invention to provide a symbol timing recovery circuit for calculating an accurate symbol rate from a received signal in a variable rate digital demodulator.

In order to achieve the above object, the present invention provides a symbol timing recovery circuit in a digital demodulator, comprising:

means for generating a clock signal in a predetermined period;

means for sampling a received signal according to the clock signal and generating a sample signal in a sampling period;

an interpolator for interpolating the sample signal according to filter tap-coefficients calculated by a fractional interval at each sampling period to obtain an interpolant in an interpolation period;

a data filter for filtering the interpolant to generate a strobe data;

a timing error detector for detecting a timing error from the strobe data to generate a timing error signal;

a loop filter for removing a noise component of the timing error signal to generate a mean timing error signal; and a controller for providing the fractional interval to the interpolator and controlling the signal processing operation of the data filter, timing error detector and loop filter, wherein the controller comprises:

calculating means for performing a calculating operation with regard to the ratio of the interpolation period to the sampling period, and the mean timing error signal and the fractional interval generated at the previous clock signal;

means for compensating the output from the calculating means at initial state;

a fraction extractor for extracting a fractional part from the output of the compensating means and outputting the fractional part as the fractional interval to the interpolator;

an integer extractor for extracting an integer part from the output of the compensating means; and a control signal generator for generating a control signal indicating the validity of the interpolant from the interpolator according to the output from the integer extractor, and outputting the control signal to said data filter, timing error detector, and loop filter.

BRIEF DESCRIPTION OF THE DRAWINGS

The above and other objects, features, and advantages of the present invention will be apparent from the following detailed description of the preferred embodiments of the invention in conjunction with the accompanying drawings, in which:

FIG. 5 is a detailed block diagram of the controller illustrated in FIG. 3.

DESCRIPTION OF THE PREFERRED EMBODIMENT

Reference will now be made in detail to the present invention, examples of which are illustrated in the accompanying drawings. Wherever possible, the same reference numbers will be used throughout the drawings to refer to the same or like parts.

Figure 1:
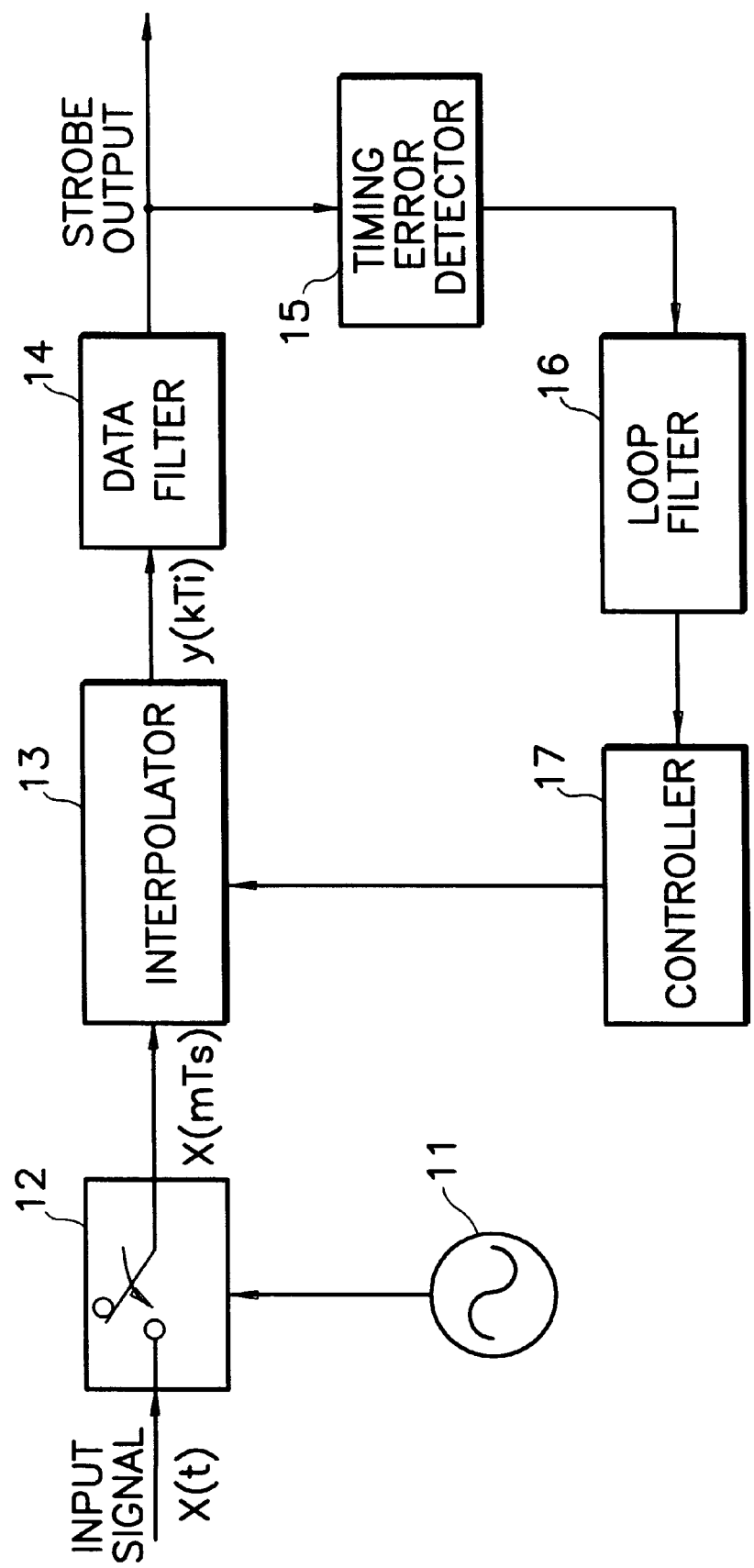
FIG. 1 is a block diagram of a conventional timing recovery circuit in a digital demodulator.
Figure 2:
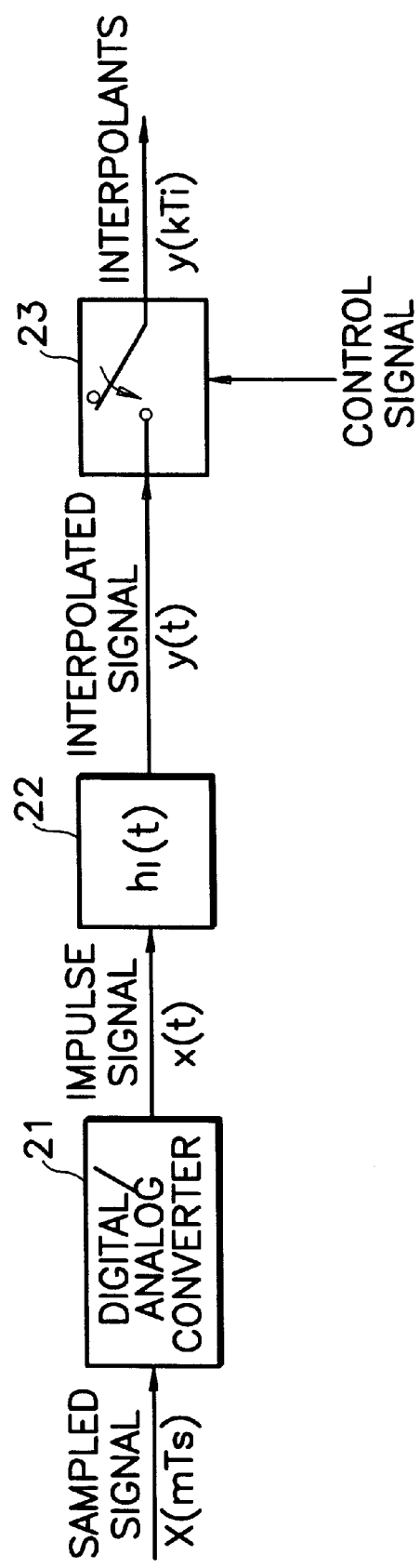
FIG. 2 is a block diagram illustrating an interpolator of FIG. 1.
Figure 3:
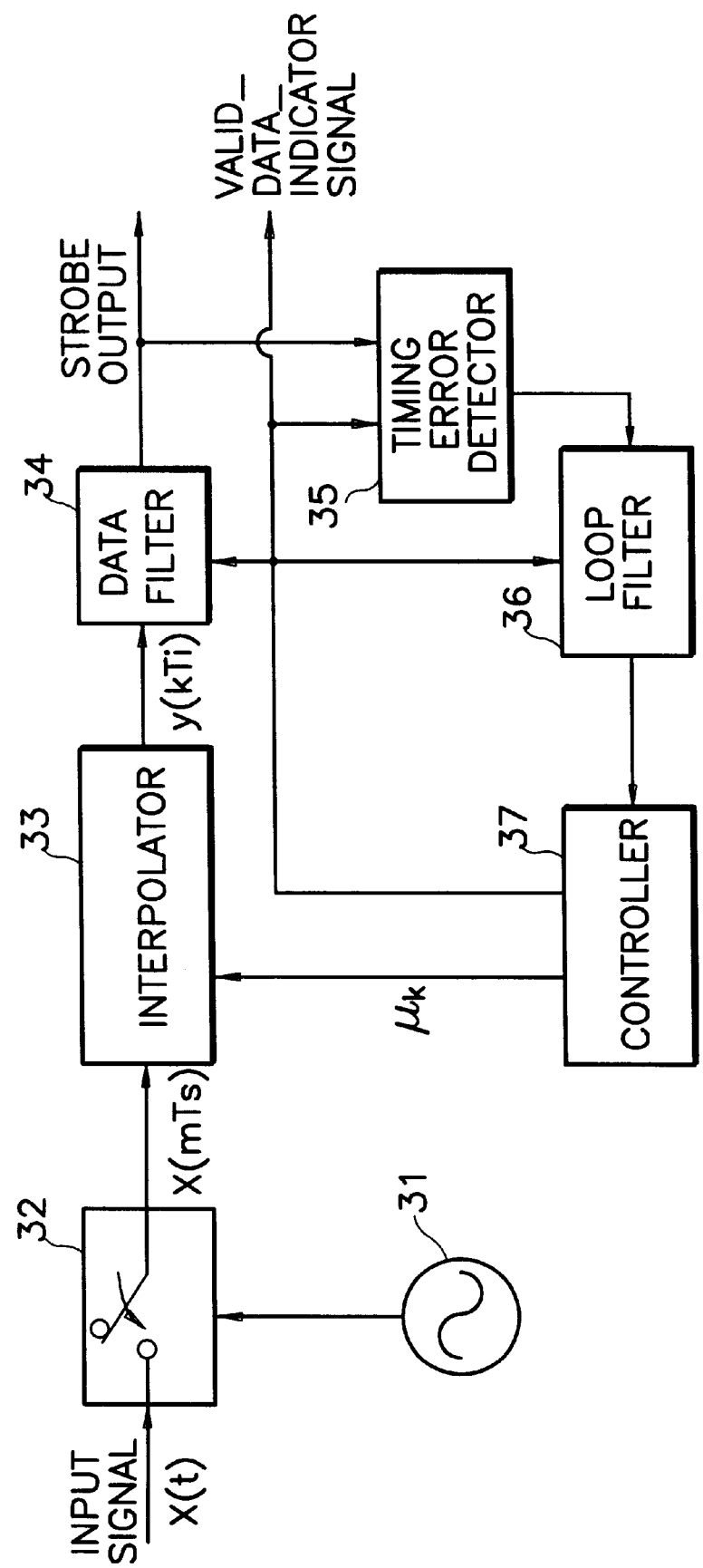
FIG. 3 is a block diagram illustrating a symbol timing recovery circuit according to the present invention.

FIG. 3 shows a block diagram of a symbol timing recovery circuit according to the preferred embodiment of the present invention. The symbol fining recovery circuit comprises a clock generator 31, a sampler 32, an interpolator 33, a data filter 34, a timing error detector 35, a loop filter 36, and a controller 37. The clock generator 31 generates a clock signal in sampling period Ts, in which aliasing does not occur among input signals X(t). According to the clock signal, the sampler 32 samples the input signal X(t) for generating and outputting the sample signal X(mTs) in sampling period Ts. The interpolator 33 stores the sample signal X(mTs) in series, and generates an interpolant y(kTi) to be multiplied with the filter tap-coefficient determined by the fractional interval $\mu_k$ from the controller 37. The data filter 34 filters the interpolant y(kTi) by down sampling to generate a strobe data for symbol timing recovery. The timing error detector 35 computes and outputs timing error φ from the strobe data. The loop filter 36 filters the timing error φ to remove a noise component and outputs a mean timing error signal Δφ.

The controller 37 calculates the fractional interval $\mu_k$ and the basepoint index increment $\Delta m_k$ from the mean timing error signal Δφ, and provides the fractional interval $\mu_k$ to the interpolator 33, and generates the valid_data_indicator signal according to the validity of the interpolant y(kTi) to control the operation of the data filter 34, the timing error detector 35, the loop filter 36, and the next sequence circuit (not shown) for selecting only the resampled signal in an exact symbol timing.

Figure 4:
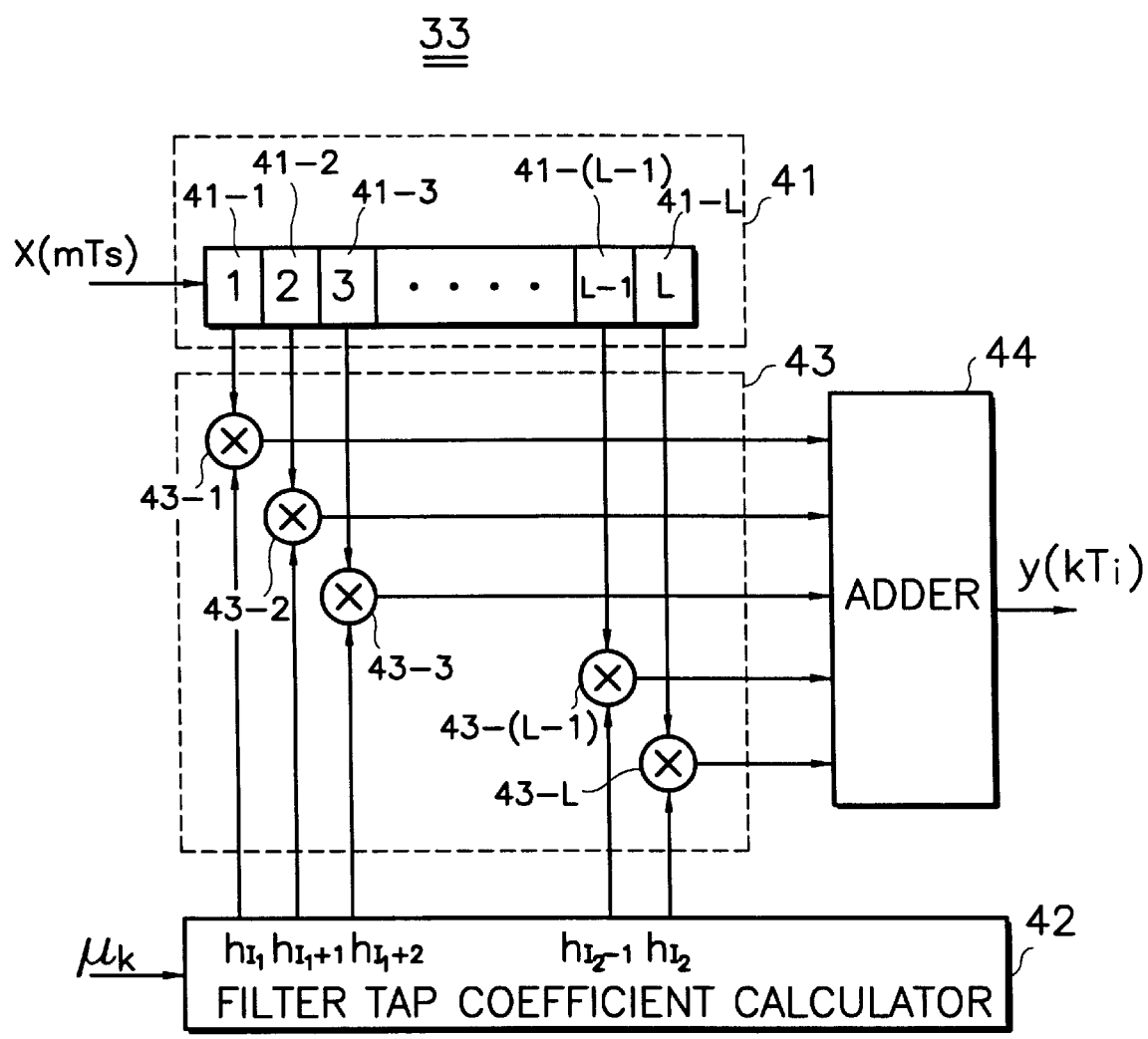
FIG. 4 is a detailed block diagram of the interpolator illustrated in FIG. 3.

FIG. 4 shows a detailed block diagram of the interpolator 33 illustrated in FIG. 3. The interpolator 33 comprises a shift register 41, having L stages 41-1 to 41-L, a filter tap-coefficient calculator 42, L number of multipliers 43, and an adder 44. The shift register 41 sequentially receives the sample signal X(mTs) converted from input signal X(t) in sampling period Ts, shifts it to the right, stores it, and outputs it in parallel in interpolation period Ti. The filter tap-coefficient calculator 42 calculates and outputs L number of the filter tap-coefficients $h_f[(i+\mu_k)Ts]$ in accordance with the fractional interval $\mu_k$ from the controller 37. The L number of multipliers 43 multiply the L number of sample signals X(mTs) from the shift register 41 by the L number of filter tap-coefficients from the filter tap-coefficient calculator 42, and provide L number of multiplied values to the adder 44. The adder 44, then, adds the outputs from the multipliers 43-1 to 43-L, and outputs the added values as an interpolant y(kTi) in sampling period Ts.

Since the shift register 41 operates according to the clock of sampling period Ts, the interpolator 33 calculates the interpolant y(kTi) by the sample signal X(mTs) synchronized with the next clock of sampling period Ts. Therefore, the value of basepoint index increment $\Delta m_k$ of the interpolants y(kTi) calculated at each clock is set at 1. However, if the value of basepoint index increment $\Delta m_k$ is greater than or equal to 2, the sample signal X(mTs) must be interpolated after being shifted by the basepoint index increment $\Delta m_k$.

Accordingly, the controller 37 has a function of generating control signals, which determine the validity of the current interpolants from the basepoint index increment $\Delta m_k$, in order to exactly control the signal processing in the stages after the interpolator 33.

FIG. 5 shows a detailed block diagram of the controller 37 illustrated in FIG. 3. The controller 37 comprises a calculator 51, a damper 52, a fraction extractor 53, an integer extractor 54, and a control signal generator 55. The calculator 51 comprises a fractional interval memory 57 for storing the fractional interval $\mu_k$, a state buffer 58 for storing the ratio Ti/Ts of the interpolation period to the sampling period, a first adder 59 for adding the ratio stored in the state buffer 58 to the mean timing error signal Δφ from the loop filter 36, and a second adder 60 for adding the previous fractional interval $\mu_{k-1}$ supplied from the fractional interval memory 57 with the output from the first adder 59. The output value of the calculator 51 is expressed by the following expression 9.

$$\Delta\phi_{k-1} + \frac{Ti}{Ts} + \mu_{k-1} \quad \text{Expression 9}$$

In the above expression 9, since the ratio Ti/Ts is greater than 1, the value of the above expression 9 is greater than 1. But, in the initializing state of the system, the output from the calculator 51 can be less than 1.

Hence, the output value from the calculator 51 is not clamped by the damper 52 if it is more than 1, whereas the damper 52 compensates the value less than "1" by raising it to "1" and outputs the results to the fraction extractor 53 and the integer extractor 54.

The fraction extractor 53 extracts the fraction part from the output values from the clamper 52, and outputs it to the fractional interval memory 57 and filter tap-coefficient calculator 42. The fraction part, which is the current fractional interval $\mu_k$, is used for calculating the filter tap-coefficient in the interpolator 33. The integer extractor 54 extracts the integer part from the output value of the damper 52, and outputs it to the control signal generator 55. The integer part is the sum of the basepoint index increment $\Delta m_k$ and the mean timing error signal $\Delta\phi_k$.

Here, the sample signal to be interpolated in the interpolator 33 is shifted by as much as the output value from the integer extractor 54, prior to obtaining interpolants having valid data.

Accordingly, the control signal generator 55 delays and reduces sequentially the output value from the integer extractor 54, compares the delayed and reduced value with the reference value, and generates a control signal according to the compared result to selectively process the signal in the succeeding circuit to the interpolator 33.

The control signal generator 55 comprises a temporary memory 61, a selection signal generator 62, a multiplexer 63, a subtractor 64, and a decision unit 65. The temporary memory 61 provides the previous output from the subtractor 54 to the selection signal generator 62 and an input terminal of the multiplexer 63, and stores the current output of the subtractor 64. The selection signal generator 62 compares the output of the temporary memory 61 to the reference value "1", and outputs a selection signal according to the result to the multiplexer 63 and subtractor 64, where the selection signal is "1" if the input value is greater than 1, and "0" if the input value is less than or equal to 1. The multiplexer 63 selects one of two inputs according to the selection signal provided by the selection signal generator 62, and outputs the selectant. If the selection signal is "0", the multiplexer 63 outputs the extracted integer from the integer extractor 54, and the output from the temporary memory 61, if the selection signal is "1". The subtractor 64 subtracts the selection signal from the output value of the multiplexer 63, and outputs the subtracted value to the decision unit 65, and updates the temporary memory 61.

Therefore, in the control signal generator 55, the temporary memory 61 outputs the obtained value from the integer extractor 54 to the decision unit 65 when "1" or "0" is stored in the temporary memory 61, whereas it reduces values from the temporary memory 61, one by one, and outputs the reduced values when "2" is stored in the temporary memory 61.

The decision unit 65 compares the output value from the subtractor 64 to "2", and according to the compared result, it controls the operations of the fractional interval memory 57 of the calculator 51, the data filter 34, the timing error detector 35, the loop filter 36, and the succeeding circuit (not shown).

Namely, the decision unit 65 generates the valid_data_indicator signal when the output value from the subtractor 64 is "1", for controlling the operations of the fractional interval memory 57, the data filter 34, the timing error detector 35, the loop filter 36, and the succeeding circuit.

In addition, when the output value from the subtractor 64 is greater than "2", the decision unit 65 does not generate the valid_data_indicator signal, in order not to clock the fractional interval memory 57, the data filter 34, the timing error detector 35, the loop filter 36, and the succeeding circuit at the next clock.

Now, referring to FIGS. 3, 4 and 5, an operation of the controller 37 will be described in detail.

First, assume that the mean timing error signal Δφ is zero, and the ratio of the interpolation period Ti to the sampling period Ts is 1.3. The following Table 1 shows the various signal value according to the time k(=t/Ti).

TABLE 1

Signal values of the controller according to the time k(=t/Ti)

| k (=t/Ti) | Ti/Ts + $\mu_{k-1}$ | $\Delta m_k$ | The input value of the fractional interval memory 57 ($\mu_k$) | The input value of the temporary memory 61 | Valid_data _indicator |
|---|---|---|---|---|---|
| −1 |  |  | 0 | 0 | 1 |
| 0 | 1.3 | 1 | 0.3 | 1 | 1 |
| 1 | 1.6 | 1 | 0.6 | 1 | 1 |
| 2 | 1.9 | 1 | 0.9 | 1 | 1 |
| 3 | 2.2 | 2 | 0.2 | 2 | 0 |
| 4 | 2.2 | 2 | 0.2 | 1 | 1 |
| 5 | 1.5 | 1 | 0.5 | 1 | 1 |
| 6 | 1.8 | 1 | 0.8 | 1 | 1 |
| 7 | 2.1 | 2 | 0.1 | 2 | 0 |
| 8 | 2.1 | 2 | 0.1 | 1 | 1 |
| 9 | 1.4 | 1 | 0.4 | 1 | 1 |
| 10 | 1.7 | 1 | 0.7 | 1 | 1 |
| 11 | 2.0 | 2 | 0 | 2 | 0 |
| 12 | 2.0 | 2 | 0 | 1 | 1 |
| 13 | 1.3 | 1 | 0.3 | 1 | 1 |
| . | . | . | . | . | . |
| . | . | . | . | . | . |
| . | . | . | . | . | . |

In the above table 1, Ti/Ts+$\mu_{k-1}$ is the output value of the damper 52, $\Delta_{mk}$ is the put value of the integer extractor 54, and the valid_data_indicator signal is the output of the decision unit 65.

When k=−1, the system is initialized. Both the fractional interval memory 57 and the temporary memory 61 are set at 0, and the valid_data_indicator signal is "1".

When k=0, the output value of the damper 52 is 1.3. The fraction extractor 53 extracts and outputs "0.3" to the interpolator 33, and since $\Delta m_0$ is "1", the input signal to the decision unit 65 is "1", and accordingly the decision unit 65 outputs the valid_data_indicator signal "1" for an accurate signal processing in the stages after the interpolator 33.

When k=1, similar to the above, the output value from the damper 52 is 1.6, i.e., $\mu_0$+Ti/Ts=0.3+1.3=1.6. Similarly to when k=0, the fraction extractor 53 extracts and outputs 0.6 to the interpolator 33, and since $\Delta m_1$ is "1", the input signal to the decision unit 65 is "1", and accordingly the decision unit 65 outputs the valid_data_indicator signal "1".

On the other hand, when k=3, the output value $\mu_2$+Ti/Ts from the damper 52 is 2.2. Hence, the integer extractor 54 extracts 2 as the integer value. At this stage, the value stored in the temporary memory 61 is "1", and accordingly the value from the integer extractor 54 is directly outputted to the decision unit 65. As a result, the decision unit 65 generates the valid_data_indicator signal "0" to prevent farther processing of signal beyond the interpolator 33.

When k=4, as in when k=3, the clamped value $\mu_3$+Ti/Ts "2.2" remains unchanged, since the valid_data_indicator signal from the decision unit 65 was "0" at the previous clock, and the fractional interval memory 57 was not updated. Since the stored value of the temporary memory 61 is "2", the output value from the subtractor 64 is "1", subtracted by 1 from the stored value "2", and the subtracted value is outputted to the decision unit 65.

Accordingly, the decision unit 65 generates the valid_data_indicator signal "1" for indicating the validity of the current interpolant.

In the preferred embodiment of the present invention, when the ratio of the interpolation period to the sampling period Ti/Ts is "1.3", the basepoint index increment $\Delta m_k$ has the value of 1 or 2. However, when the Ti/Ts is relatively large, the basepoint index increment $\Delta m_k$ becomes 3, 4, 5, . . . ,etc. At this time, the valid_data_indicator signal remains "low" as much as the number of clocks corresponding to the value of the basepoint index increment $\Delta m_k$.

As described above, the interpolator of the present invention performs the interpolating after calculating the filter tap-coefficients by using the fractional interval from the controller at each sampling period Ts. The controller generates a control signal for processing only the valid data of the outputs from the interpolator, in the succeeding circuit of the interpolator. Accordingly, the digital demodulator for recovering the signals received at variable rate by calculating the exact symbol rate can be simplified.

While this invention has been described in connection with what is presently considered to be the most practical and preferred embodiments, it is to be understood that the invention is not limited to the disclosed embodiment, but, on the contrary, it is intended to cover various modifications and equivalent arrangements included within the spirit and scope of the appended claims.

What is claimed is:

1. A symbol timing recovery circuit in a digital demodulator, comprising:

means for generating a clock signal having a predetermined period;

means for sampling a received signal according to the clock signal and generating a sample signal in a sampling period;

an interpolator for interpolating the sample signal according to filter tap-coefficients calculated by a fractional interval at each sampling period to obtain an interpolant in an interpolation period;

a data filter for filtering the interpolant to generate a strobe data;

a timing error detector for detecting a timing error from the strobe data to generate a timing error signal;

a loop filter for removing a noise component of the timing error signal to generate a mean timing error signal; and a controller for providing the fractional interval to said interpolator and controlling the signal processing operation of said data filter, timing error detector and loop filter, wherein said controller comprises:

calculating means for performing a calculating operation with regard to the ratio of the interpolation period to the sampling period, the mean timing error signal and the fractional interval generated at the previous clock signal;

means for compensating the output from said calculating means at an initial state;

a fraction extractor for extracting a fractional part from the output of said compensating means and outputting the fractional part as the fractional interval to said interpolator;

an integer extractor for extracting an integer part from the output of said compensating means; and a control signal generator for generating a control signal indicating the validity of the interpolant from said interpolator according to the output from said integer extractor, and outputting the control signal to said data filter, timing error detector and loop filter.

2. The symbol timing recovery circuit of claim 1, wherein said interpolator comprises:

a memory for shifting and sequentially storing the sample signal from said sampling means according to the sampling period, and outputting the sample signal stored therein in parallel according to the interpolation period;

means for calculating the filter tap-coefficients corresponding to each sample signal in accordance with the fractional interval;

a plurality of multipliers for multiplying each sample signal from said memory by the filter tap-coefficients and outputting the multiplied values, respectively; and means for adding the multiplied values and outputting the added value as the interpolant to said data filter.

3. The symbol timing recovery circuit of claim 1, wherein said calculating means comprises:

a first memory for storing the ratio of the interpolation period to the sampling period;

a second memory for storing the output from said fraction extractor according to the control signal from said controller;

a first adder for adding the output from said first memory to the output from said loop filter; and a second adder for adding the output from said second memory to the output from said first adder.

4. The symbol timing recovery circuit of claim 1, wherein said control signal generator comprises:

a memory for storing a comparing value;

a selection signal generator for comparing the comparing value provided from said memory to a "1" and generating a selection signal according to the comparison result;

selecting means for selecting and outputting one of the outputs from said integer extractor or from said memory according to the selection signal;

means for subtracting the selection signal from the output of said selecting means and providing the subtracted values to the memory as the comparing value; and a decision unit for comparing the output from said subtracting means to "2" and generating the comparison result as the control signal.

* * * * *